United States Patent
Zhao et al.

(10) Patent No.: US 10,880,757 B2
(45) Date of Patent: Dec. 29, 2020

(54) DISCOVERY SIGNAL PROCESSING METHOD, BASE STATION AND COMPUTER STORAGE MEDIUM

(71) Applicant: ZTE Corporation, Shenzhen (CN)

(72) Inventors: Yajun Zhao, Shenzhen (CN); Linmei Mo, Shenzhen (CN); Hanqing Xu, Shenzhen (CN)

(73) Assignee: ZTE CORPORATION

( * ) Notice: Subject to any disclaimer, the term of this patent is extended or adjusted under 35 U.S.C. 154(b) by 0 days.

(21) Appl. No.: 15/031,433

(22) PCT Filed: Oct. 24, 2014

(86) PCT No.: PCT/CN2014/089481
§ 371 (c)(1),
(2) Date: May 23, 2016

(87) PCT Pub. No.: WO2015/062451
PCT Pub. Date: May 7, 2015

(65) Prior Publication Data
US 2016/0262029 A1  Sep. 8, 2016

(30) Foreign Application Priority Data

Nov. 1, 2013 (CN) .......................... 2013 1 0535676
May 27, 2014 (CN) .......................... 2014 1 0228839

(51) Int. Cl.
*H04W 24/02* (2009.01)
*H04W 48/14* (2009.01)
(Continued)

(52) U.S. Cl.
CPC .......... *H04W 24/02* (2013.01); *H04B 7/2656* (2013.01); *H04J 11/00* (2013.01);
(Continued)

(58) Field of Classification Search
CPC . H04W 24/02; H04W 48/16; H04W 72/0486; H04W 72/085; H04W 72/1226;
(Continued)

(56) References Cited

U.S. PATENT DOCUMENTS 5,040,238 A  8/1991  Comroe et al.
8,493,887 B2  7/2013  Palanki et al.
(Continued)

FOREIGN PATENT DOCUMENTS

CN  102111879 A  6/2011
CN  102263723 A  11/2011
(Continued)

OTHER PUBLICATIONS

Mediatek Inc: "Performance Evaluation for Small Cell Discovery Using New Schemes Based on CSI-RS and PRS", R1-132281, May 2013, TSG-RAN WG1, #73, Fukuoka, Japan, 6 pages. (Year: 2013).*

(Continued)

*Primary Examiner* — Quoc Thai N Vu
(74) *Attorney, Agent, or Firm* — McDonald Hopkins LLC (57) ABSTRACT

Disclosed in the embodiment of the present invention is a discovery signal processing method. The method comprises: a base station configuring part of available resources of a designated reference signal as DS (Discovery Signal) resources; the base station sending a DS according to the configuration, and a terminal measuring the DS according to the configuration. Also disclosed in the embodiment of the present invention is a base station, which at least comprises: a configuration module configured to configure the DS resources and including taking part of available resources of the designated reference signal as the DS resources; and a sending module configured to send the DS according to the configuration. Also disclosed in the embodiment of the (Continued)

present invention is a computer storage medium in which a computer-executable command for executing the discovery signal processing method is stored.

17 Claims, 1 Drawing Sheet

(51) Int. Cl.

| | | |
|---|---|---|
| H04W 76/27 | (2018.01) | |
| H04B 7/26 | (2006.01) | |
| H04J 11/00 | (2006.01) | |
| H04L 5/00 | (2006.01) | |
| H04W 16/26 | (2009.01) | |
| H04W 16/32 | (2009.01) | |
| H04W 56/00 | (2009.01) | |
| H04W 72/04 | (2009.01) | |
| H04W 72/12 | (2009.01) | |
| H04W 88/08 | (2009.01) | |

(52) U.S. Cl.
CPC .......... *H04L 5/0051* (2013.01); *H04L 5/0062* (2013.01); *H04W 16/26* (2013.01); *H04W 16/32* (2013.01); *H04W 48/14* (2013.01); *H04W 56/001* (2013.01); *H04W 72/0486* (2013.01); *H04W 72/1226* (2013.01); *H04W 76/27* (2018.02); *H04W 88/08* (2013.01)

(58) Field of Classification Search
CPC ... H04W 76/046; H04W 16/02; H04W 16/26; H04W 16/32; H04W 48/10; H04W 48/14; H04W 56/001; H04W 88/08; H04L 5/005; H04L 5/0048; H04L 5/0051; H04L 5/0062; H04B 7/2656

See application file for complete search history.

(56) References Cited

U.S. PATENT DOCUMENTS

| | | | | |
|---|---|---|---|---|
| 2010/0015921 A1* | 1/2010 | Yavuz | ................. | H04W 72/085 455/63.1 |
| 2011/0212738 A1 | 9/2011 | Wan | | |
| 2012/0094663 A1 | 4/2012 | Awoniyi | | |
| 2012/0094665 A1 | 4/2012 | Soliman | | |
| 2012/0094666 A1 | 4/2012 | Awoniyi | | |
| 2012/0213109 A1* | 8/2012 | Xu | ................. | H04B 7/024 370/252 |
| 2013/0196675 A1 | 8/2013 | Xiao et al. | | |
| 2013/0288668 A1 | 10/2013 | Pragada et al. | | |
| 2014/0038598 A1 | 2/2014 | Ren et al. | | |
| 2014/0086173 A1 | 3/2014 | Sadeghi et al. | | |
| 2014/0112162 A1 | 4/2014 | Tavildar et al. | | |
| 2014/0169326 A1 | 6/2014 | Levanen et al. | | |
| 2014/0219162 A1* | 8/2014 | Eyuboglu | ............. | H04W 16/26 370/315 |
| 2014/0314000 A1 | 10/2014 | Liu et al. | | |
| 2014/0334399 A1 | 11/2014 | Xu et al. | | |
| 2015/0004969 A1 | 1/2015 | Han et al. | | |
| 2015/0029874 A1* | 1/2015 | Davydov | ............. | H04B 7/0417 370/252 |
| 2015/0049649 A1* | 2/2015 | Zhu | ................. | H04L 5/0092 370/277 |
| 2015/0049824 A1* | 2/2015 | Kim | ................. | H04B 7/0456 375/267 |
| 2015/0171948 A1 | 6/2015 | Xiao et al. | | |
| 2015/0181406 A1 | 6/2015 | Seo et al. | | |
| 2015/0215908 A1* | 7/2015 | Seo | ................. | H04W 72/042 370/329 |
| 2015/0327093 A1 | 11/2015 | Yang et al. | | |
| 2015/0351003 A1 | 12/2015 | Ahn et al. | | |
| 2015/0358094 A1 | 12/2015 | Yi et al. | | |
| 2015/0358899 A1* | 12/2015 | Ko | ................. | H04W 72/042 370/252 |
| 2015/0372851 A1 | 12/2015 | Kakishima et al. | | |
| 2015/0373628 A1 | 12/2015 | Hwang et al. | | |
| 2015/0373670 A1* | 12/2015 | Fang | ................. | H04W 48/10 370/312 |
| 2016/0007269 A1 | 1/2016 | Chae et al. | | |
| 2016/0050617 A1 | 2/2016 | Hwang et al. | | |
| 2016/0057664 A1 | 2/2016 | Ahn et al. | | |
| 2016/0066255 A1 | 3/2016 | Marinier et al. | | |
| 2016/0142898 A1 | 5/2016 | Poitau et al. | | |
| 2016/0174169 A1* | 6/2016 | Harada | ................. | H04W 52/44 370/254 |
| 2016/0295634 A1* | 10/2016 | Miao | ................. | H04W 4/70 |

FOREIGN PATENT DOCUMENTS

| | | |
|---|---|---|
| CN | 102468926 A | 5/2012 |
| CN | 102546113 A | 7/2012 |
| CN | 102823168 A | 12/2012 |
| CN | 103155643 A | 6/2013 |
| CN | 103220066 A | 7/2013 |
| CN | 103312434 A | 9/2013 |
| CN | 103369583 A | 10/2013 |
| CN | 103581993 A | 2/2014 |
| CN | 103686689 A | 3/2014 |
| EP | 2533595 A1 | 12/2012 |
| JP | 2014512145 A | 5/2014 |
| JP | 2014512245 A | 5/2014 |
| JP | 2014514837 A | 6/2014 |
| JP | 2015515219 A | 5/2015 |
| KR | 20130050273 | 5/2013 |
| WO | 2010054593 A1 | 5/2010 |
| WO | 2011038695 A1 | 4/2011 |
| WO | 2011119005 A1 | 9/2011 |
| WO | 2012136846 A1 | 10/2012 |
| WO | 2012142436 A1 | 10/2012 |
| WO | 2013157892 A1 | 10/2013 |
| WO | 2014010850 A1 | 1/2014 |
| WO | 2014040258 A1 | 3/2014 |

OTHER PUBLICATIONS

CMCC: "Procedures for Efficient Discovery of Small Cells", R1-132547, May 2013, TSG-RAN WG1 #73, Fukuoka, Japan, 5 Pages, (Year: 2013).*
International Search Report in international application No. PCT/CN2014/089481, dated Feb. 6, 2015.
English Translation of the Written Opinion of the International Search Authority in international application No. PCT/CN2014/089481, dated Feb. 6, 2015.
NEC Group: "Discussion on possible small cell discovery schemes",3GPP Draft; RI-134255, 3rd Generation Partnership Project (3GPP), Mobile Competence Centre ; 650, Route Des Lucioles ; F-06921 Sophia-Antipolis Cedex ;France » vol. RAN WG1 No. Guangzhou, China; Oct. 7, 2013-Oct. 11, 2013 Sep. 27, 2013 (Sep. 27, 2013), XPO50717149,Retrieved from the Internet: URL http://www.3 p.org/ftp/tsg ran/WGIRL I/TSGRI_74b/Docs/ ""[retrieved on Sep. 27, 2013],mailed on Sep. 27, 2013.
"3rd Generation Partnership Project; Technical Specification Group Radio Access Network; Small cell enhancements for E-UTRA and E-UTRAN—Physical layer aspects (Release 12)",3GPP Standard; 3GPP TR 36.872, 3rd Generation Partnership Project (3GPP), Mobile Competence Centre ; 650, Route Des Lucioles ; F-06921 Sophia-Antipolis Cedex ;France,vol. RAN WG1, No. V12.0.0, Sep. 20, 2013 (Sep. 20, 2013), pp. 1-78, XP050712719,[retrieved on Sep. 20, 2013],mailed on Sep. 20, 2013.
Interdigital: "Evaluation scenarios and methodology for LTE D2D",3GPP Draft; RI-131345, 3rd Generation Partnership Project (3GPP), Mobile Competence Centre ; 650, Route Des Lucioles ; F-06921 Sophia-Antipolis Cedex ;France vol. RAN WG1, No. Chicago, USA; Apr. 15, 2013-Apr. 19, 2013 Apr. 6, 2013 (Apr. 6, 2013), XP05O6972O0, Retrieved from the Internet:URL:http://www.3gpp.org/ftp/tsg_ran/WGI_RL I/TSGRI_72b/Docs/— [retrieved on Apr. 6, 2013],mailed Apr. 6, 2013.

(56) References Cited

OTHER PUBLICATIONS

Supplementary European Search Report in European application No. 14858730.6, dated Jul. 18, 2016.
ETRI, Cell state transition and small cell discovery, 3GPP TSG RAN WG1 Meeting #74bis R1-134332, 3GPP, mailed on Oct. 7, 2013.
Huawei et al., Analysis and comparison of technologies for discovery enhancement, 3GPP TSG RAN WG1 Meeting #74bis R1-134063, 3GPP, mailed on Oct. 7, 2013.
3GPP TSG RAN WG1 Meeting #73 R1-132559; May 24, 2013; ETRI; "Discovery signal design based on legacy signals" Section 2.
3GPP TSG RAN WG1 Meeting #74 R1-132892; Aug. 19-23, 2013; Huawei, HiSilicon; "Potential enhancements for small cell discovery".
3GPP TSG RAN WG1 Meeting #73, R1-132559; ,May 20-24, 2013; ETRI; "Discovery signal design based on legacy signals".
3GPP TSG RAN WG1 Meeting #74bis, R1-134255; Oct. 7-11, 2013; NEC Group; "Discussion on possible small cell discovery schemes".
State Intellectual Property Office of People's Republic of China, Notification of First Office Action for Application No. 201410228839.0, report dated May 23, 2019, China.
Intellectual Property India, Examination report under sections 12 &13 for Application No. 201617018705, report dated Dec. 30, 2019.
European Office Action dated Jan. 30, 2020; European Patent No. 14893431.8.
European Search Report dated Apr. 4, 2017; European Patent No. 14893431.8.
3GPP TSG RAN WG1 Meeting #76bis, Ericsson, "Design of Discovery Bursts and Procedures." (2014).
3GPP TSG RAN WG1 Meeting #77, NTT DOCOMO, "Views on detailed design of discovery signal for Rel. 12 discovery procedure." (2014).
International Search Report dated Feb. 27, 2015; International Patent Application No. PCT/CN2014/086755; ISA/CN.
U.S. Office Action dated Jul. 25, 2018, U.S. Appl. No. 15/313,880, filed Nov. 23, 2016.

\* cited by examiner

DISCOVERY SIGNAL PROCESSING METHOD, BASE STATION AND COMPUTER STORAGE MEDIUM

TECHNICAL FIELD

The disclosure relates to a small cell technology, and in particular to a Discovery Signal (DS) processing method for a small cell deployment scenario, a base station and a computer storage medium.

BACKGROUND

A small cell technology adopts a low-power radio access node, and may be configured to broaden coverage of a macro cell to offload increasing data traffic of the macro cell, thereby increasing a utilization rate of a radio spectrum resource. At present, a Long Term Evolution-Advanced (LTE-Advanced) system improves network capacity by adopting the small cell technology.

A small cell is usually smaller in size, and covers 10 meters to 2 kilometres. A flexible manner may be adopted for a small cell deployment scenario of an LTE network, and for example, the small cell deployment scenario may include a macro cell level and a small cell level, wherein macro cells and small cells may be deployed on the same frequency point to namely implement co-channel deployment, and may also be deployed on different frequency points to namely implement non-co-channel deployment. There may also be no macro cells but small cells deployed in the small cell deployment scenario of the LTE network. Moreover, the small cells may be deployed in both an indoor environment and an outdoor environment, and may be deployed both sparsely and densely.

A small cell is an interference-limited system, and there exists a complicated interference relationship between a macro cell and a small cell and between small cells. Each cell is dynamically scheduled to serve terminals therein respectively. In addition, along with movement of User Equipment (UE), there may be UE continuously handed over into and out of a small cell, and a system load and interference of a small cell may be obviously fluctuated, so that it is necessary to adopt a certain interference coordination method, such as a small cell adaptive opening and closing mechanism and an adaptive power regulation mechanism, to perform interference suppression and coordination on the small cell.

Specifically, a basic idea of a small cell adaptive opening and closing mechanism is to adaptively open and close some under-loaded small cells to reduce inter-cell interference. The opened cells are called ON cells, and the ON cells normally send data channels and common channels; and the closed cells are called OFF cells, and the OFF cells may shut down the data channels and a part of common channels. However, both an ON cell and an OFF cell may send cell Discovery Signals (DSs) configured for cell discovery and selection, activation/deactivation determination and the like.

At present, an existing reference signal, such as a Channel State Information Reference Signal (CSI-RS) resource, is usually adopted as a DS. However, an existing CSI-RS is configured to implement CSI measurement, so that time domain density is greater and there are more antennae. For a small cell deployment scenario, more cells are required to be measured during DS measurement. Moreover, there are usually more CSI-RS sending antenna ports for CSI measurement, and a period is usually shorter, while a DS usually does not require so many antenna ports and such a short period. That is, direct multiplexing of an existing CSI-RS for a DS may undoubtedly bring a problem of unnecessary radio resource overheads.

SUMMARY

A technical problem to be solved by the embodiment of the disclosure is to provide a DS measurement method, a base station and a computer storage medium, which may reduce radio resource overhead, thereby improving spectrum efficiency.

In order to solve the technical problem, the embodiment of the disclosure provides a DS processing method, which may include that:

a base station performs configuration on DS resources by taking a part of available resources of specified reference signals as the DS resources; and the base station sends DSs according to the configuration, and UE measures the DSs according to the configuration.

The method may further include that: the base station performs configuration on DS resources by taking all available resources of the specified reference signals as the DS resources.

The specified reference signals may include CSI-RSs; and the configuration may include:

configuration of CSI-RS resources sent by one or more antenna ports of antenna ports sending the CSI-RSs as the DS resources; or independent configuration of CSI-RS resources sent by one or more antenna ports as the DS resources.

The DS resources may include: a combination of a part of available resources of the CSI-RSs and other signals, the other signals including one of or any combination of: Primary Synchronization Signals and/or Secondary Synchronization Signals (PSSs and/or SSSs), Common Reference Signals (CRSs) or Positioning Reference Signals (PRSs).

The configuration may further include: mapping of the antenna ports of the CSI-RS resources is configured to be consistent with mapping of antenna ports of the other signals; or the antenna ports of the CSI-RS resources and the antenna ports of the other signals are configured to be mapped to different ports.

The CSI-RS resources configured as the DS resources may be orthogonal to existing CSI-RS resources configured for CSI measurement.

The specified reference signals may include PSSs and/or SSSs; and the DS resources may include any combination of: the PSSs and/or SSSs, and one or more of CSI-RSs, CRSs or PRSs.

Burst structures of the DSs may be specified as follows: burst structures of DSs sent in a same cell are different; or, a burst structure of each DS sent in a part of cells in a cell cluster includes all signals configured to configure the DS resources, and burst structures of DSs sent in other cells include a part of signals configured to configure the DS resources; or the burst structure of each sent DS includes all the signals configured to configure the DS resources.

The DSs may include PSSs and/or SSSs and CSI-RSs; and the configuration may further include that:

the base station configures the UE to implement synchronization on the basis of the PSSs and/or SSSs and perform Radio Resource Management (RRM) measurement on the basis of the CSI-RSs;

logic Identities (IDs) and logic antenna ports corresponding to the PSSs and/or SSSs and to the CSI-RSs are independently configured respectively, and mapping relationships are configured to be consistent or inconsistent; and the CSI-RS parts of the DSs are configured independently from conventional CSI-RSs configured for CSI measurement, or consist of a part of ports and periods of the conventional CSI-RSs configured for CSI measurement.

The method may further include that: the base station notifies the UE to measure the DSs according to configuration, where the notification may be implemented as follows: notification is performed through Radio Resource Control (RRC) signalling.

Configuration information notified to the UE may include:

a cell set for DS measurement, including Cell IDs (CIDs) and corresponding DS measurement patterns; or whether a measured cell is synchronized with a cell where the UE resides and/or a synchronization deviation between the measured cell and the cell where the UE resides.

The method may further include that: a Pseudo-Noise (PN) sequence is initialized by adopting a Physical Cell Identity (PCI) or an Access Point Identity (API).

The embodiment of the disclosure further provides a base station, which may at least include:

a configuration module, configured to perform configuration on DS resources, including taking a part of available resources of specified reference signals as the DS resources; and a sending module, configured to send DSs according to the configuration.

The configuration module may further be configured to perform configuration on DS resources by taking all available resources of the specified reference signals as the DS resources.

The specified reference signals may be CSI-RSs; and the DS resources may include: a combination of a part of available resources of the CSI-RSs and other signals, the other signals including one of or any combination of: PSSs and/or SSSs, CRSs or PRSs.

The configuration module may specifically be configured to configure CSI-RS resources sent by one or more antenna ports of antenna ports sending the CSI-RSs as the DS resources; or independently configure CSI-RS resources sent by one or more antenna ports as the DS resources.

The configuration module may further be configured to:

configure mapping of the antenna ports of the CSI-RS resources to be consistent with mapping of antenna ports of the other signals; or configure the antenna ports of the CSI-RS resources and the antenna ports of the other signals to be mapped to different ports.

The specified reference signals may include PSSs and/or SSSs; and the DS resources may include any combination of: the PSSs and/or SSSs, and one or more of CSI-RSs, or CRSs or PRSs.

Burst structures of the DSs may be specified as follows: burst structures of DSs sent in a same cell are different; or, a burst structure of each DS sent in a part of cells in a cell cluster includes all signals configured to configure the DS resources, and burst structures of DSs sent in other cells include a part of signals configured to configure the DS resources; or the burst structure of each sent DS includes all the signals configured to configure the DS resources.

The DSs may include PSSs and/or SSSs and CSI-RSs; and the configuration module may further be configured to:

configure UE to implement synchronization on the basis of the PSSs and/or SSSs and perform RRM measurement on the basis of the CSI-RSs;

configure independently logic IDs and logic antenna ports corresponding to the PSSs and/or SSSs and to the CSI-RSs respectively, and configure mapping relationships to be consistent or inconsistent; and configure CSI-RS parts of the DSs independently from conventional CSI-RSs configured for CSI measurement, or to be consisting of a part of ports and periods of the conventional CSI-RSs configured for CSI measurement.

The base station may further include a notification module, configured to notify the UE to measure the DSs according to configuration; and configuration information notified to the UE may include:

a cell set for DS measurement, including CIDs and corresponding DS measurement patterns; or whether a measured cell is synchronized with a cell where the UE resides and/or a synchronization deviation between the measured cell and the cell where the UE resides.

The CSI-RS resources configured as the DS resources may be orthogonal to existing CSI-RS resources configured for CSI measurement.

In order to solve the problem, the embodiment of the disclosure further provides a computer storage medium having stored thereon computer-executable instructions for executing the abovementioned method.

Compared with a conventional art, the technical solutions provided by the embodiment of the disclosure have the advantages that the base station performs configuration on DS resources by taking a part of available resources of the specified reference signals as the DS resources, the base station sends the DSs according to configuration, and the UE measures the DSs according to configuration. In the DS processing method of the embodiment of the disclosure, configuration is performed on DS resources by taking only a part of available resources of the specified reference signals, such as the CSI-RSs, as the DS resources, so that radio resource overhead is reduced, and spectrum efficiency is improved. An embodiment of the disclosure further includes that: configuration is performed on DS resources by taking all the available resources of the specified reference signals as the DS resources, where the specified reference signals may be CSI-RSs, so that compatibility with an existing DS processing method is achieved.

DETAILED DESCRIPTION

In order to make the purpose, technical solutions and advantages of the disclosure clearer, the embodiment of the disclosure will be described below with reference to the drawings in detail. It is important to note that embodiments in the disclosure and characteristics in the embodiments may be freely combined under the condition of no conflicts.

Figure 1:
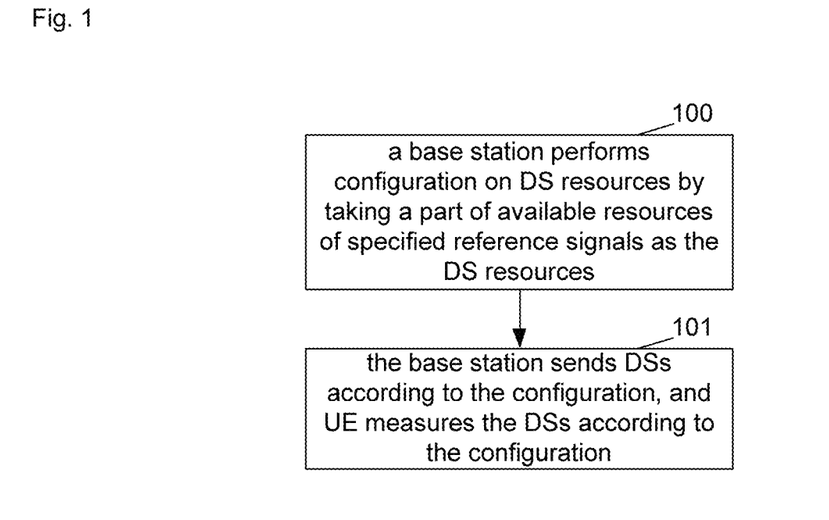
FIG. 1 is a flowchart of a DS processing method according to an embodiment of the disclosure.

FIG. 1 is a flowchart of a DS processing method according to an embodiment of the disclosure, and as shown in FIG. 1, the method includes:

Step 100: a base station performs configuration on DS resources by taking a part of available resources of specified reference signals as the DS resources.

In the step, the specified reference signals may be CSI-RSs, and the DS resources include a combination of a part of available resources of the CSI-RSs and one or more of other signals (such as PSSs and/or SSSs, CRSs or PRSs). Here, the CSI-RS resources configured as DS components are called DS-RSs for short.

Specific implementation of configuration in the step includes: configuration of CSI-RS resources sent by one or more antenna ports in antenna ports sending the CSI-RSs as the DS resources; or, independent configuration of CSI-RS resources sent by one or more antenna ports as the DS resources.

In an embodiment of the disclosure, the antenna ports of the CSI-RS resources taken as the DS resources and antenna ports of other signal resources may be configured to be consistently mapped. For example, if it is configured that a DS port number is 1 and the DSs consist of CSI-RS resources and PRS resources, CSI-RS port 0 is mapped to DS port 0 while the PRS resources are also mapped to DS port 0; and they may also be configured to be mapped to different ports respectively, and for example, if it is configured that the DS port number is 2 and the DSs consist of CSI-RS resources and PRS resources, CSI-RS ports 0 and 1 are mapped to DS ports 0 and 1 while the PRS resources are mapped to port 0, that is, the ports of the two resource components are independently mapped.

When the DSs are formed by combining the CSI-RS resources and the other signal resources, different signal components may realize different functions according to own characteristics respectively:

for the CSI-RS resource components, more cells may be better detected and discovered since a mechanism for avoiding interference by neighbouring cell puncturing may be adopted;

for the other signal components, the other signal resources which are PRS resources may further be configured for detection of synchronization between a part of or all cells detected and discovered on the basis of the CSI-RS resources;

if the other signal resources are CRS resources, they may further be configured for RRM measurement of a part of or all cells detected and discovered on the basis of the CSI-RS resources; and if the other signal resources are PSS and/or SSS resources, they may further be configured for synchronization detection of a part of or all cells detected and discovered on the basis of the CSI-RS resources.

In the step, the specified reference signals may also be PSSs and/or SSSs, and the DS resources include a combination of a part of available resources of the PSSs and/or SSSs and one or more of other signals (such as CSI-RSs, CRSs or PRSs). Here, the PSSs and/or SSSs resources configured for the DS components are called DS-RSs for short.

In the step, burst structures of the DSs may be DS burst structures consisting of different structures, for example:

different DS burst structures may be configured in the same cell; or, different DS burst structures may be configured in multiple cells, that is, a burst structure of each DS sent in a part of cells in a cell cluster includes all signals configured to configure the DS resources, and burst structures of DSs sent in other cells include a part of signals configured to configure the DS resources; or, the burst structure of each sent DS includes all the signals configured to configure the DS resources.

Step 101: the base station sends DSs according to the configuration, and UE measures the DSs according to the configuration.

The step further includes that: the base station notifies the UE to measure the DSs according to configuration. For example, the UE is notified to perform DS measurement according to configuration through RRC signalling. Wherein, configuration information notified to the UE includes: a cell set for DS measurement, i.e. CIDs and corresponding DS measurement patterns; or whether a measured cell is synchronized with a cell where the UE resides and/or a synchronization deviation between the measured cell and the cell where the UE resides.

In the DS processing method of the embodiment of the disclosure, configuration is performed on DS resources by taking only a part of available resources of the specified reference signals, such as the CSI-RSs, as the DS resources, so that radio resource overhead is reduced, and spectrum efficiency is further improved.

The method of the embodiment of the disclosure further includes that: configuration is performed on DS resources by taking all available resources of the specified reference signals as the DS resources according to a preselected processing solution, where the specified reference signals may be CSI-RSs.

For example, it is supposed that there are cell 1 (Cell_1), Cell_2, Cell_3, UE1, UE2 and UE3. In the embodiment, it is supposed that a subset of CSI-RS available patterns and sequences is selected to process the DS resources as a resource available for the DSs.

Specifically, in the embodiment, Resource Element (RE) positions available for the DSs form a subset of a CSI-RS available RE position set; a DS period may be configured to be longer than a CSI-RS period, and the DS period is equal to a CSI-RS available period or a multiple of the CSI-RS available period; and a DS port number of a cell is usually smaller than a CSI-RS port number, and the resources for the DSs are resources of a part of ports of the CSI-RSs, and are supposed to be preferably configured to be port 1/0 or 2/3 or 4/5 or 6/7 of the CSI-RSs in the embodiment.

The following two solutions may be adopted for DS port mapping.

One solution is that CSI-RS resources sent by one or more antenna ports in antenna ports sending CSI-RSs are configured as the DS resources. Specifically, a cell is configured to send CSI-RSs and select a part of ports for sending DSs. For example, it is supposed that Cell_1 is configured with 8 CSI-RS antenna ports and port 0 and port 1 are defined as DS ports. Port 0 and port 1 configured for DSs are configured according to a DS requirement: if power of the DSs is required to be different from that of the CSI-RSs, power of port 0 and port 1 is configured independently from power of the other ports; when opening/closing operation is performed on the cell, if the DSs are required to be sent when the cell is closed, the signals of only port 0 and port 1 are sent, and sending of the CS-RSs of the other ports is stopped when the cell is closed; and if a neighbouring cell is required to be configured not to send any signal at RE positions, where the DSs are sent, of Cell_1, port 0 and port 1 are required to require RE positions corresponding to other neighbouring cells to avoid interference like other CSI-RSs according to a CSI-RS requirement (for example, no signals are sent at the corresponding RE positions), and also require RE positions of other cells in the neighbouring cells to avoid interference according to an interference avoiding requirement of the DSs (for example, no signals are sent at the corresponding RE positions). For example: it is supposed that a neighbouring cell set required to avoid interference with the CSI-RSs of Cell_1 is A and an RE resource set is B; a neighbouring cell set required to avoid interference with the DSs of Cell_1 is C and an RE resource set is D; and then, a cell set required by port 0 and port 1 of Cell_1 to be avoided from the neighbouring cells is A∪C and an RE set required to be avoided is B∪C, wherein symbol "∪" represents union.

The other solution is that CSI-RS resources sent by one or more antenna ports are independently configured as the DS resources. Herein, antenna ports of one or more independently configured DS are independent from antenna ports of the CSI-RSs. That is, the CSI-RSs and the DSs are independently configured respectively, positions of time and frequency resources occupied by the CSI-RSs and the DSs are different, and their antenna ports are independently mapped. For example, only CSI-RSs sent by a part of antenna ports are configured for the DSs, and the other antenna ports do not send any CSI-RS. A preferred configuration combination of selected CSI-RS port resources is: 1/0, 2/3, 4/5 and 6/7, that is: resources corresponding to port 1, or port 2, or port 4 or port 6 are preferred if the port number is 1, and resources corresponding to port 0 and port 1, or port 2 and port 3, or port 4 and port 5 or port 6 and port 7 are preferred if the port number is 2. In addition, CSI-RS power corresponding to the DSs may not be regulated along with power adaptation, that is, the power is configured independently from conventional CSI-RSs.

RE resources, corresponding to the DSs of the cell, of the neighbouring cells are configured not to send any signal. The neighbouring cell set is configured independently from a conventional CSI-RS set; and the cell set is usually larger than a cell set corresponding to CSI-RS measurement.

For the two solutions, an inter-coordinated cell DS configuration pattern relationship and mutual puncturing may be adopted. That is, DS resources of Cell_1 and Cell_2 may be orthogonally configured; and for a DS RE position of Cell_1, a corresponding RE position of Cell_2 adjacent to Cell_1 may be configured not to send any signal to avoid DS interference of Cell_2 to Cell_1. Cell_1 may notify Cell_2 of configured and sent DS information through a communication interface with Cell_2, and Cell_2 determines own DS sending and operation of avoiding DS interference to Cell_1 with reference to the DS information of Cell_1.

According to the technical solution provided by the embodiment of the disclosure, after the CSI-RS resources are configured for the DS resources, for CSI-RSs for CSI measurement, multiple cells may adopt the same ID for scrambling for sequence initialization, and the DSs are required to distinguish different logic cells, or virtual CIDs and CSI measurement requirements are different, so that CSI-RS sequences corresponding to CSI and DS should be different. Therefore, the method further includes that: a PN sequence is initialized. PN sequence initialization of the DSs may be implemented by adopting a PCI or an API. An orthogonal sequence adopted for the CSI-RSs may be multiplexed by the DSs.

In Step 100 of the embodiment of the disclosure, implementation of multiple types of signals adopted for configuring the DS resources may further include, but not limited to, the following manners.

Manner 1: each sent signal structure includes all signals configured to configure the DS resources, and for example, the DSs consist of PSSs and/or SSSs and one or more of CSI-RSs, or CRSs and PRSs. For example, if the DSs include PSSs and/or SSSs and CSI-RSs, burst structures of each DS include both the PSSs and/or SSSs and the CSI-RSs. Similarly, if the DSs include one or more of CRSs, PRSs and CSI-RSs, the burst structures of the DSs include both the PSSs and/or SSSs and the CSI-RSs.

Since different types of signals in the DSs have different functions, simultaneous existence of all different types of signals is favourable for the UE to realize all detection and measurement functions in each DS burst.

Manner 2: each signal structure sent in only a part of cells in a cell cluster, i.e. multiple cells, includes all the signals configured to configure the DS resources, and signal structures sent by other cells only include a part of signal types.

For example, if the DSs include PSSs/SSSs and CSI-RSs, it is supposed that burst structures of each DS of Cell 1 (or Transmission Point (TP) 1) include both the PSSs and/or SSSs and CSI-RSs. Similarly, if the DSs include a combination of: PSSs and/or SSSs and one or more of CRSs, PRSs or CSI-RSs, the burst structures of each DS include both the PSSs and/or SSSs and one or more of CRSs, PRSs or CSI-RSs. Cell 2 (or TP 2) is synchronized on the basis of the PSSs and/or SSSs of cell 1 (or TP1), and the burst structures of each DS only include the CSI-RSs. Similarly, if the DSs include one of or any combination of CRSs, PRSs or CSI-RSs, the burst structures of each DS only include one of or any combination of CRSs, PRSs or CSI-RSs.

Manner 3: different DS burst structures may be configured in a cell.

For example, if a DS includes a PSS and/or SSS, a CSI-RS and a CRS, burst structure 1 of the DS is as follows: the burst structure of the DS simultaneously includes a PSS and/or SSS, a CSI-RS and a CRS; burst structure 2 of the DS is as follows: the burst structure of each Ds only includes a CSI-RS; burst structure 3 of the DS is as follows: the burst structure of each DS only includes a CRS; burst structure 4 of the DS is as follows: the burst structure of each DS includes both a CRS and a CSI-RS; burst structure 5 of the DS is as follows: the burst structure of each DS includes both a PSS and/or SSS and a CRS; burst structure 6 of the DS is as follows: the burst structure of each DS includes both a PSS and/or SSS and a CSI-RS; and burst structure 7 of the DS is as follows: the burst structure of each DS only includes a PSS and/or SSS.

One or more of the burst structures may be configured in different sending periods of a cell or TP to fulfil different aims by virtue of the signal types.

In such a manner, the UE may implement synchronization of the cell or the TP on the basis of the PSS and/or SSS, perform RRM measurement, cell/TP ID acquisition and the like by virtue of the CSI-RS component and perform RRM measurement and cell ID acquisition by virtue of the CRS component. Generally speaking, CRS-based RRM measurement is more accurate than CSI-RS-based RRM measurement.

From the embodiment of implementing multiple types of signals adopted for configuring the DS resources, it can be seen that by the method of only sending DS burst structures including a part of signals in the embodiment of the disclosure, resources occupied by signal sending are reduced as much as possible, thereby reducing overhead and reducing interference.

In the embodiment of the disclosure, a DS resource configuration principle is that: if closer synchronization tracking is required, a burst period including a PSS and/or SSS component may be configured to be shorter; and if more timely and accurate RRM measurement is required, a burst structure period including a CSI-RS or CRS component may be configured to be shorter.

In addition, specific implementation of configuration of the DS resources in the embodiment of the disclosure is favourable for coordinating a configuration relationship between different cells or TPs, and configuration of different burst structures for different cells and different periods is favourable for a coordination relationship between their resources, for example, for coordinating a time and frequency orthogonal relationship.

In an embodiment of the disclosure, for the condition that the DSs consist of PSSs and/or SSSs and CSI-RSs, the base station configures the UE to implement synchronization on the basis of the PSSs and/or SSSs and perform RRM measurement on the basis of the CSI-RSs. Their corresponding logic IDs and logic antenna ports may be independently configured respectively, and mapping relationships may be configured to be consistent, and may also be configured to be inconsistent. The CSI-RS parts of the DS may be configured independently from conventional CSI-RSs configured for CSI measurement, or may also consist of a part of ports and periods of the conventional CSI-RSs configured for CSI measurement.

With configuration of DSs for Cell_1 as an example, it is supposed that the DSs includes PSSs and/or SSSs and CSI-RSs and the PSS parts in the DSs and normal PSSs and/or SSSs of Cell_1 are consistent in sequence, that is, a corresponding ID is a PCI of Cell_1 and port mapping may also be kept consistent. When Cell_1 enters a closed state, a sending period may be longer than that of the normal PSSs and/or SSSs of Cell_1. It may also be configured that the normal PSSs and/or SSSs of Cell_1 are directly used and resources of only a part of a period are configured to be used, and for example, a normal PSS and/or SSS sending period of Cell_1 is 5 ms and the PSS and/or SSS parts of the DSs may be components of a 5×N (ms) period, N being more than or equal to 1. That is, when the cell is in the closed state, the PSS and/or SSS parts of the DSs are sent according to the 5×N (ms) period. When the cell is in an opened state, there are two manners.

Manner 11: the UE is configured to continue measuring the PSS and/or SSS parts of the DSs according to the 5×N (ms) period, and it is supposed that only the PSSs and/or SSSs of this part of the period belong to the PSS and/or SSS parts of the DSs in the conventional PSS and/or SSS parts. Or, Manner 12: the whole conventional PSSs and/or SSSs are taken as the PSS and/or SSS parts of the DSs.

In an embodiment of the disclosure, UE of a cell where DSs are sent may be configured to perform measurement on the basis of Manner 12, and UE of another neighbouring cell may be configured to perform measurement according to Manner 11.

Logic ID and logic antenna ports corresponding to the CSI-RS parts in the DSs and the PSS and/or SSS parts of the DSs may be independently configured respectively, and then the mapping relationships may be configured to consistent, and may also be configured to be inconsistent. When the cell is in the closed state, the CSI-RS parts of the DSs are sent according to a period T, and when the cell is in the opened state, there are two manners:

Manner 21: the CSI-RS parts of the DSs are continuously sent in a manner the same as that adopted in the closed state, or, Manner 22: the conventional CSI-RSs configured for CSI measurement may be multiplexed as the CSI-RS parts of the DSs, including a period and ports.

In an embodiment of the disclosure, the UE of the cell where the DS is sent may be configured to perform measurement on the basis of Manner 22, and the UE of the other neighbouring cell may be configured to perform measurement according to Manner 21.

In an embodiment of the disclosure, for the condition that DSs consist of PSSs and/or SSSs and CRSs, the base station configures the UE to implement synchronization on the basis of the PSSs and/or SSSs and perform RRM measurement on the basis of the CRSs. Their corresponding logic IDs and logic antenna ports may be independently configured respectively, and mapping relationships may be configured to be consistent, and may also be configured to be inconsistent. The CRS parts of the DSs may be configured independently from conventional CRSs configured for CSI measurement, or may also consist of a part of ports and periods of the conventional CRSs configured for CSI measurement.

With configuration of DSs for Cell_1 as an example, it is supposed that the DSs includes PSSs and/or SSSs and CRSs and the PSS parts in the DSs and normal PSSs and/or SSSs of Cell_1 are consistent in sequence, that is, a corresponding ID is a PCI of Cell_1 and port mapping may also be kept consistent. When Cell_1 enters the closed state, a sending period may be longer than that of the normal PSSs and/or SSSs of Cell_1. It may also be configured that the normal PSSs and/or SSSs of Cell_1 are directly used and resources of only a part of a period are configured to be used, and for example, a normal PSS and/or SSS sending period of Cell_1 is 5 ms and the PSS and/or SSS parts of the DSs may be components of a 5×N (ms) period, N being more than or equal to 1. That is, when the cell is in the closed state, the PSS and/or SSS parts of the DSs are sent according to the 5×N (ms) period. When the cell is in the opened state, there are two manners.

Manner 11: the UE is configured to continue measuring the PSS and/or SSS parts of the DSs according to the 5×N (ms) period, and it is supposed that only the PSSs and/or SSSs of this part of the period belong to the PSS and/or SSS parts of the DSs in the conventional PSS and/or SSS parts. Or, Manner 12: the whole conventional PSSs and/or SSSs are taken as the PSS and/or SSS parts of the DSs.

In an embodiment of the disclosure, UE of a cell where DSs are sent may be configured to perform measurement on the basis of Manner 12, and UE of another neighbouring cell may be configured to perform measurement according to Manner 11.

Logic IDs and logic antenna ports corresponding to the CRS parts in the DSs and the PSS and/or SSS parts of the DSs may be independently configured respectively, and then the mapping relationships may be configured to consistent, and may also be configured to be inconsistent. When the cell is in the closed state, the CRS parts of the DSs are sent according to a period T, and when the cell is in the opened state, there are two manners:

Manner 21: the CRS parts of the DSs are continuously sent in a manner the same as that adopted in the closed state, or, Manner 22: the conventional CRSs configured for CSI measurement may be multiplexed as the CSI-RS parts of the DSs, including a period and ports.

In an embodiment of the disclosure, the UE of the cell where the DS is sent may be configured to perform measurement on the basis of Manner 22, and the UE of the other neighbouring cell may be configured to perform measurement according to Manner 21.

Application examples are listed as follows:
(1) the base station configures Cell_1 to send DS-RSs which are configured independently from CSI-RSs,
configures DS-RS antenna ports of Cell_1, and
configures that a DS-RS antenna port number of a cell is 1 or 2 and an adopted pattern and sequence are preferably a sequence and pattern 1/0 or 2/3 or 4/5 or 6/7 of the CSI-RSs.

When there is a single DS-RS port, a sequence and pattern of 1 or 2 or 4 or 6 of the CSI-RS is preferred; and when there are two DS-RS ports, the adopted pattern and sequence are preferably a sequence and pattern of port 1/0 or 2/3 or 4/5 or 6/7 of the CSI-RS. A CSI-RS antenna port number of a cell is usually more than or equal to a DS-RS antenna port number.

(2) DS-RSs of each of Cell_2 and Cell_3 and Cell_1 are configured to be staggered in the time domain and the frequency domain; and it is configured that there is no data sent at positions, corresponding to time and frequency resource positions (i.e. RE positions occupied by the DS-RSs) where the DS-RSs are sent in Cell_1, of Cell_2 and Cell_3. Therefore, Cell_2 and Cell_3 may not bring interference to the time and frequency resource positions where the DS-RSs are sent in Cell_1. The CSI-RSs of the cells may also be configured to be staggered in the time domain and the frequency domain, it is configured that no data is sent at time and frequency resource positions, corresponding to the CSI-RSs of the cell, of neighbouring cells, and a set of cells which are staggered and do not send data is configured independently from the DS-RSs, that is, sets of the two may be: the same, partially overlapped and not overlapped. A CSI-RS cell set is configured on the basis of a CSI measurement requirement, and the DS-RS cell set is configured on the basis of a cell discovery and measurement requirement. Generally speaking, the DS-RS cell set is larger than the CSI-RS cell set.

Set A of neighbouring cell REs corresponding to DS-RS sending RE positions of Cell_1 is A and set B of REs not sending any data may be: A=B, B∈A, A∈B and A∩B≠ϕ; and moreover, sets of REs, which do not send any data, of Cell_2 and Cell_3 may be configured to be the same or different. The abovementioned difference is preferably a difference in time-domain corresponding relationship, for example, a difference in period.

The DS-RSs are configured to be sent by only occupying a part of cell system frequency bandwidth.

For example, a system bandwidth of Cell_1 is N Resource Blocks (RBs) (for example, N=100), and it may be configured to the DS-RSs only occupy M RBs (for example, M=25).

Preferably: a) when N is more than or equal to 25, M=25; and b) when N is smaller than 25, M=N. The preferred solution aims to configure that as smaller frequency bandwidth as possible is occupied to reduce overhead in case of greater system bandwidth and configure that the whole system bandwidth is occupied to ensure measurement performance in case of small system bandwidth.

When a part of system bandwidth is occupied, choices about the frequency-domain positions are as follows:

Choice 1: DS-RSs of different cells are configured to occupy middle of the system bandwidth, the UE is only required to measure a frequency band of a middle part of the system bandwidth, and behaviours of measuring different cells are consistent, so that measurement complexity is reduced; and Choice 2: frequency bands occupied by adjacent cells are configured to be staggered, wherein such a solution is favourable for staggering the DS-RSs on frequency band to keep orthogonality as much as possible during DS-RS sending of subframes of different cells.

An ID adopted for generation of a PN sequence for the DS-RSs of Cell_1 is configured.

A selection solution may be as follows:

the PN sequence is configured to be generated by taking a PCI of Cell_1 as one of parameters, which may enable the UE to conveniently obtain the PCI on the basis of the PN sequence or rapidly detect the DS-RSs on the basis of the known PCI; and the PN sequence is configured to be generated by taking an API as one of parameters, which may ensure the UE to conveniently obtain the API on the basis of the PN sequence or rapidly detect the DS-RSs on the basis of the known API.

A cell may be in an ON state or an OFF state, and a pattern sending configuration relationship in different states is as follows:

there are two configuration solutions for a cell in the ON state (Cell On):

Solution 1: only conventional CSI-RSs are configured to be sent, and DS-RSs are not independently configured, that is, a part of or all ports of conventional CSI-RS ports are specified to be configured for the DS-RSs, so that signal types may be reduced, and complexity of the UE and a system may also be reduced to a certain extent; and Solution 2: sending of conventional CSI-RSs and independently configured DS-RSs are simultaneously configured, so that DS-RS sending behaviours in the ON and OFF states of the cell may be unified, and measurement behaviours of the UE may also be unified.

For a cell in the OFF state (Cell OFF), the cell is configured to only send DS-RSs and stop sending conventional CSI-RSs.

That is, for solution 1, only CSI-RSs taken as DS-RSs are sent, and the other conventional CSI-RSs are not sent; and for solution 2, only independently configured DS-RSs are sent, and the conventional CSI-RSs are not sent.

CSI-RS resources for DSs are orthogonal to CSI-RSs for CSI. Since sending of the CSI-RSs for CSI may be stopped and restarted along with ON/OFF of the cell, power regulation is performed along with power adaptation and unbalanced sending power of different ports may bring a CSI measurement bias, it is necessary to independently configure and separately send DSs and normal CSI-RSs.

A period of zero-power CSI-RSs is configured to be selected from a period set of CSI-RSs for the DSs; and all or a part of a length of the period corresponds to a period, configured in another cell in cell set A, of CSI-RSs for DSs. For example, there are Cell1, Cell2 and Cell3, and zero-power CSI-RSs configured for Cell1 are the whole set or subset of CSI-RS patterns, configured for Cell2 and Cell3, for DSs; and a DS measurement period may be longer than a CSI measurement period, particularly in an OFF state, and if a period the same as the CSI measurement period is configured, it means that short-period sending is also required during sending, and unnecessary overhead may be generated.

In the embodiment of the disclosure, the base station may definitely indicate the UE of the DS measurement aim through RRC signalling.

In the embodiment, only port0 or port0+port1 are required to be measured for DS measurement, and even though there are more ports, configuration is not required, so that a Physical Downlink Shared Channel (PDSCH) is only required to mute port0 or port0+port1 (i.e. a part of ports) to further reduce overhead.

The UE is notified to perform DS measurement, and information notified to the UE includes:

to-be-measured DS-RS cell set A, information including CIDs, a corresponding DS-RS measurement pattern (including an adopted sequence, time and frequency resource positions (periods, occupied RBs, starting subframe positions and the like) and the like), a measurement ID, a measurement amount and a detection and measurement reporting rule (for example, a detection reporting threshold, a measurement value reporting threshold, a maximum reported cell number, DS-RS measurement based on one or more ports and the like), wherein the DS-RS measurement pattern may be the whole set or subset of DS-RS transmission patterns.

Whether a measured cell is synchronized with Cell_1 where the UE resides may further be indicated, and a synchronization deviation between the measured cell and Cell_1 may also be notified. If the measured cell is synchronized, the UE performs measurement on the basis of the synchronization supposition to reduce synchronization detection time, thereby improving measuring efficiency; if the measured cell is not synchronized and the synchronization deviation is not notified, the UE is required to suppose that the measured cell is in an asynchronous state, and is required to perform synchronization measurement and further perform cell discovery measurement; and if the measured cell is not synchronized and the synchronization deviation is notified, the UE is required to suppose that the measured cell is in the asynchronous state, and is required to perform synchronization reception regulation on the basis of the notified synchronization deviation and further perform cell discovery measurement. For an asynchronous cell, if a synchronization deviation (time including a DS sending/measurement moment; inter-cell synchronization deviation) is notified, synchronization detection time may be reduced, thereby improving measurement efficiency. Whether the cells are synchronized or not and the synchronization deviation may be obtained by inter-network measurement, and may also be obtained by measurement and feedback of other UE.

Whether the cells are synchronized or not and synchronization deviation information require inter-cell (and/or inter-carrier) interaction.

A synchronization reference cell (Cell_syc) of the measured cell Cell_1 may also be notified to the UE by the system, and the UE may synchronize Cell_1 on the basis of Cell_syc.

Different measurement patterns are configured according to the state of the cell.

If solution 1 is adopted for sending, the UE is configured to measure the whole set or subset of conventional CSI-RSs, and is preferably configured to measure port0 or port0+port1 only.

If solution 2 is adopted for sending, the UE is configured to measure the whole set or subset of conventional DS-RSs, so that the measurement behaviours of the UE in the ON and OFF states of the cell may be unified.

Intra-frequency measurement and inter-frequency measurement configure different measurement respectively, and if the measured cell and a serving cell where the UE is located are on the same frequency point, it is intra-frequency measurement, otherwise it is inter-frequency measurement.

A preferred configuration is that: intra-frequency measurement is adopted for Reference Signal Receiving Power (RSRP), and inter-frequency measurement is adopted for Reference Signal Receiving Quality (RSRQ).

During inter-frequency measurement, whether a target cell is a synchronized carrier or not is preferably notified and indicated.

A measurement and feedback object may be configured on the basis of cell discovery information fed back by the UE. That is, the UE is configured to perform cell discovery detection at first, and the cell discovery information is fed back to the base station; and the base station selects a further-measured cell set C according to the cell discovery information fed back by the UE, thereby further configuring that the UE performs RRM measurement, for example, RSRP, RSRQ and/or synchronization, on the selected cell set C.

The method of the embodiment of the disclosure further includes that: the UE performs measurement and feedback on the basis of a network configuration.

The UE performs measurement and feedback according to configuration of the base station. A shorter period is preferably configured to feed back the cell discovery information, mainly including CID information and also including signal strength and/or signal quality levels. The intensity and quality levels, for example, high, middle and low levels, are configured to the UE by the base station.

A signal strength and/or quality information feedback period of the UE may be configured to be longer.

Figure 2:
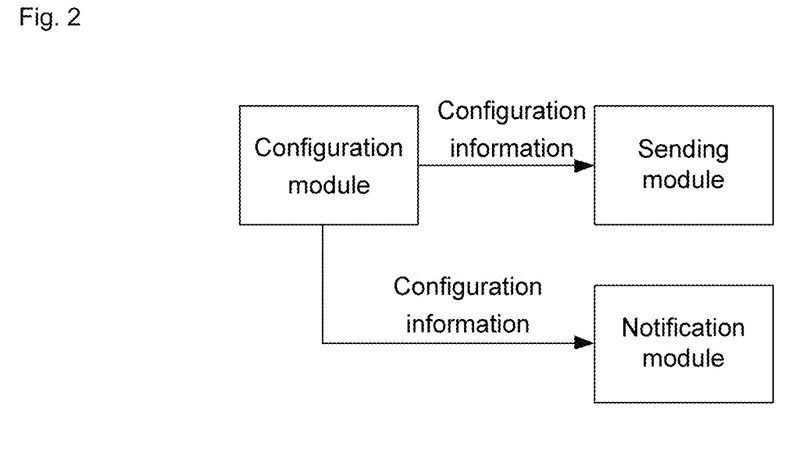
FIG. 2 is a structure diagram of a base station according to an embodiment of the disclosure.

FIG. 2 is a structure diagram of a base station according to an embodiment of the disclosure, and as shown in FIG. 2, the base station at least includes:

a configuration module, configured to configure DS resources, including taking a part of available resources of specified reference signals as the DS resources, and further configured to perform configuration on DS resources by taking all available resources of the specified reference signals as the DS resources; and a sending module, configured to send DSs according to the configuration.

The base station of the embodiment of the disclosure further includes a notification module, configured to notify UE to measure the DSs according to configuration. It is specifically configured to notify the UE to perform DS measurement according to the configuration through RRC signalling. Herein, configuration information notified to the UE includes:

a cell set for DS measurement, including CIDs and corresponding DS measurement patterns; or whether a measured cell is synchronized with a cell where the UE resides and/or a synchronization deviation between the measured cell and the cell where the UE resides.

The specified reference signals are CSI-RS, the DS resources then include a combination of a part of available resources of the CSI-RSs and one or more of other signals (such as PSSs and/or SSSs, CRSs or PRSs).

The configuration module is specifically configured to configure CSI-RS resources sent by one or more antenna ports of antenna ports sending the CSI-RSs as the DS resources; or, independently configure CSI-RS resources sent by one or more antenna ports as the DS resources.

The CSI-RS resources configured as the DS resources are orthogonal to existing CSI-RS resources configured for CSI measurement.

The configuration module is further configured to:

configure mapping of the antenna ports of the CSI-RS resources to be consistent with mapping of antenna ports of the other signals; or configure the antenna ports of the CSI-RS resources and the antenna ports of the other signals to be mapped to different ports.

Burst structures of the DSs may be specified as follows: burst structures of DSs sent in the same cell are different; or a burst structure of each DS sent in a part of cells in a cell cluster includes all signals configured to configure the DS resources, and burst structures of DSs sent in other cells include a part of signals configured to configure the DS resources; or the burst structure of each sent DS includes all the signals configured to configure the DS resources.

When the DSs include PSSs and/or SSSs and CSI-RSs, the configuration module is further configured to:

configure the UE to implement synchronization on the basis of the PSSs and/or SSSs and perform RRM measurement on the basis of the CSI-RSs;

configure independently logic IDs and logic antenna ports corresponding to the PSSs and/or SSSs and to the CSI-RSs respectively, and configure mapping relationships to be consistent or inconsistent; and configure CSI-RS parts of the DSs independently from conventional CSI-RSs configured for CSI measurement, or to be consisting of a part of ports and periods of the conventional CSI-RSs configured for CSI measurement.

The embodiment of the disclosure further provides a computer storage medium having stored therein computer-executable instructions for executing the method of any method embodiment. Each unit may be implemented by a Central Processing Unit (CPU), Digital Signal Processor (DSP) or Field-Programmable Gate Array (FPGA) in electronic equipment.

Those skilled in the art should know that the embodiment of the disclosure may be provided as a method, a system or a computer program product. Therefore, the disclosure may adopt a form of pure hardware embodiment, pure software embodiment and combined software and hardware embodiment. Moreover, the disclosure may adopt a form of computer program product implemented on one or more computer-available storage media (including, but not limited to, a disk memory, a Compact Disc Read-Only Memory (CD-ROM) and an optical memory) including computer-available program codes.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

What is claimed is:

1. A Discovery Signal (DS) processing method, comprising:
    configuring, by a base station, a DS, wherein resources of the DS comprise a part of available resources of a Channel State Information Reference Signal (CSI-RS), and further comprise at least one of: a Primary Synchronization Signal (PSS), a Secondary Synchronization Signal (SSS), a Common Reference Signals (CRS), or a Positioning Reference Signal (PRS);
    sending, by the base station, the DS to a user equipment (UE) according to configuration of the DS;
    wherein a cell cluster includes a first cell and a second cell, a burst structure of the DS configured for the first cell comprises all of the signals composing the resources of the DS, and a burst structure of the DS configured for the second cell comprises part of the signals composing the resources of the DS,
    wherein the part of available resources of the CSI-RS configured as the resources of the DS is orthogonal to existing CSI-RS resources configured for Channel State Information (CSI) measurement,
    wherein the CSI-RS part of the DS is configured independently from conventional CSI-RS configured for CSI measurement.

2. The DS processing method according to claim 1, wherein the resources of the DS comprise a part of available resources of the CSI-RS and further comprise the PRS, and wherein the part of available resources of the CSI-RS and the PRS are mapped to a same port.

3. The DS processing method according to claim 1, wherein the resources of the DS comprise a part of available resources of the CSI-RS and further comprise at least one of the PSS or SSS, and the method further comprises:
    configuring, by the base station, the UE to implement synchronization on the basis of the at least one of the PSS or SSS, and perform Radio Resource Management (RRM) measurement on the basis of the CSI-RS.

4. The DS processing method according to claim 3, wherein a logic Identity (ID) and logic antenna ports of the PSS are independently configured, a logic Identity (ID) and logic antenna ports of the SSS are independently configured.

5. The DS processing method according to claim 1, further comprising: notifying, by the base station, the UE to measure the DS according to the configuration of the DS,
    wherein the notifying comprises: notifying through Radio Resource Control (RRC) signalling.

6. The DS processing method according to claim 5, wherein configuration information notified to the UE comprises:
    a cell set for DS measurement, including Cell IDs (CIDs) and corresponding DS measurement patterns; or
    whether a measured cell is synchronized with a cell where the UE resides and/or a synchronization deviation between the measured cell and the cell where the UE resides.

7. The DS processing method according to claim 1, further comprising: initializing a Pseudo-Noise (PN) sequence by adopting a Physical Cell Identity (PCI) or an Access Point Identity (API).

8. A base station, comprising:
    a processor; and
    a memory for storing instructions executable by the processor;
    wherein the processor is configured to:
    configure a DS, wherein resources of the DS comprise a part of available resources of a Channel State Information Reference Signal (CSI-RS), and further comprise at least one of: a Primary Synchronization Signal (PSS), a Secondary Synchronization Signal (SSS), a Common Reference Signals (CRS), or a Positioning Reference Signal (PRS);

send the DS to a user equipment (UE) according to configuration of the DS;

wherein a cell cluster includes a first cell and a second cell, a burst structure of the DS configured for the first cell comprises all of the signals composing the resources of the DS, and a burst structure of the DS configured for the second cell comprises part of the signals composing the resources of the DS, wherein the part of available resources of the CSI-RS configured as the resources of the DS is orthogonal to existing CSI-RS resources configured for Channel State Information (CSI) measurement, wherein the CSI-RS part of the DS is configured independently from conventional CSI-RS configured for CSI measurement.

9. The base station according to claim 8, wherein the resources of the DS comprise a part of available resources of the CSI-RS and further comprise the PRS, and wherein the part of available resources of the CSI-RS and the PRS are mapped to a same port.

10. The base station according to claim 8, wherein the resources of the DS comprise a part of available resources of the CSI-RS and further comprise at least one of the PSS or SSS, and the processor is further configured to:

configure the UE to implement synchronization on the basis of the at least one of the PSS or SSS, and perform Radio Resource Management (RRM) measurement on the basis of the CSI-RS.

11. The base station according to claim 10, wherein a logic Identity (ID) and logic antenna ports of the PSS are independently configured, a logic Identity (ID) and logic antenna ports of the SSS are independently configured.

12. The base station according to claim 8, where the processor is further configured to notify the UE to measure the DS according to the configuration of the DS, wherein the processor notifies the UE through Radio Resource Control (RRC) signalling.

13. The base station according to claim 12, wherein configuration information notified to the UE comprises:

a cell set for DS measurement, including Cell IDs (CIDs) and corresponding DS measurement patterns; or whether a measured cell is synchronized with a cell where the UE resides and/or a synchronization deviation between the measured cell and the cell where the UE resides.

14. The base station according to claim 8, where the processor is further configured to initialize a Pseudo-Noise (PN) sequence by adopting a Physical Cell Identity (PCI) or an Access Point Identity (API).

15. A non-transitory computer storage medium having stored therein computer-executable instructions for executing a Discovery Signal (DS) processing method, the method comprising:

configuring, by a base station, a DS, wherein resources of the DS comprise a part of available resources of a Channel State Information Reference Signal (CSI-RS), and further comprise at least one of: a Primary Synchronization Signal (PSS), a Secondary Synchronization Signal (SSS), a Common Reference Signals (CRS), or a Positioning Reference Signal (PRS);

sending, by the base station, the DS to a user equipment (UE) according to configuration of the DS;

wherein a cell cluster includes a first cell and a second cell, a burst structure of the DS configured for the first cell comprises all of the signals composing the resources of the DS, and a burst structure of the DS configured for the second cell comprises part of the signals composing the resources of the DS, wherein the part of available resources of the CSI-RS configured as the resources of the DS is orthogonal to existing CSI-RS resources configured for Channel State Information (CSI) measurement, wherein the CSI-RS part of the DS is configured independently from conventional CSI-RS configured for CSI measurement.

16. The non-transitory computer storage medium according to claim 15, wherein the resources of the DS comprise a part of available resources of the CSI-RS and further comprise the PRS, and wherein the part of available resources of the CSI-RS and the PRS are mapped to a same port.

17. The non-transitory computer storage medium according to claim 15, wherein the resources of the DS comprise a part of available resources of the CSI-RS and further comprise at least one of the PSS or SSS, and the method further comprises:

configuring, by the base station, the UE to implement synchronization on the basis of the at least one of the PSS or SSS, and perform Radio Resource Management (RRM) measurement on the basis of the CSI-RS, wherein a logic Identity (ID) and logic antenna ports of the PSS are independently configured, a logic Identity (ID) and logic antenna ports of the SSS are independently configured.

* * * * *